US008965379B1

(12) United States Patent
Oroskar et al.

(10) Patent No.: US 8,965,379 B1
(45) Date of Patent: *Feb. 24, 2015

(54) ASSIGNING TRAFFIC CHANNELS TO A WIRELESS COMMUNICATION DEVICE BASED ON TRAFFIC CHANNEL UTILIZATION (71) Applicant: Sprint Spectrum L.P., Overland Park, KS (US)

(72) Inventors: Siddharth S. Oroskar, Overland Park, KS (US); Maulik K. Shah, Overland Park, KS (US); John W. Prock, Raymore, MO (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 31 days.

This patent is subject to a terminal disclaimer.

(21) Appl. No.: 13/753,573

(22) Filed: Jan. 30, 2013

(51) Int. Cl.
*H04W 36/00* (2009.01)
*H04W 36/30* (2009.01)

(52) U.S. Cl.
CPC .................................. *H04W 36/30* (2013.01)
USPC ......................................... 455/442; 455/444

(58) Field of Classification Search
CPC ..... H04W 16/00; H04W 16/04; H04W 16/06; H04W 16/14; H04W 28/02–28/0294; H04W 28/048–28/26; H04W 36/0011
USPC ............. 455/432.1–453; 370/310.2, 328, 338
See application file for complete search history.

(56) References Cited

U.S. PATENT DOCUMENTS

| 5,212,831 | A | 5/1993 | Chuang et al. |
| 5,369,681 | A | 11/1994 | Boudreau et al. |
| 5,551,064 | A | 8/1996 | Nobbe et al. |
| 5,778,319 | A | 7/1998 | Sawaki |
| 5,978,463 | A | 11/1999 | Jurkevics et al. |
| 6,023,459 | A | 2/2000 | Clark et al. |
| 6,032,045 | A | 2/2000 | Mimura |
| 6,069,871 | A | 5/2000 | Sharma et al. |
| 6,138,024 | A | 10/2000 | Evans et al. |
| 6,181,945 | B1 | 1/2001 | Lee |

(Continued)

FOREIGN PATENT DOCUMENTS

EP    2 244 502    10/2010

OTHER PUBLICATIONS

Bhan et al., U.S. Appl. No. 12/261,229, filed Oct. 30, 2008, 55 pages.

(Continued)

*Primary Examiner* — San Htun (57) ABSTRACT

A RAN may receive a call establishment request, on a first frequency, seeking to establish a call involving a WCD. In response to receiving the request, the RAN may select a plurality of wireless coverage areas, each defined using the first frequency. The RAN may determine that utilization of a first wireless coverage area of the selected wireless coverage areas meets a utilization threshold. In response, the RAN may determine that a strength at which the WCD receives signals from the first wireless coverage area exceeds the strengths at which the WCD receives signals from other wireless coverage areas in the plurality of wireless coverage areas by at least a signal strength differential value. Accordingly, the RAN may assign, to the WCD, a traffic channel from a second wireless coverage area, defined using a second frequency, for supporting the call.

18 Claims, 8 Drawing Sheets

(56) References Cited

U.S. PATENT DOCUMENTS

| | | | |
|---|---|---|---|
| 6,188,906 | B1 | 2/2001 | Lim et al. |
| 6,223,042 | B1 | 4/2001 | Raffel |
| 6,243,584 | B1 | 6/2001 | O'Byrne |
| 6,243,590 | B1 | 6/2001 | Reddy et al. |
| 6,295,451 | B1 | 9/2001 | Mimura |
| 6,556,831 | B1 | 4/2003 | Buppelmann |
| 6,643,520 | B1 | 11/2003 | Park et al. |
| 6,721,351 | B1 | 4/2004 | Lee et al. |
| 6,745,039 | B1 | 6/2004 | Di Lalla |
| 6,798,786 | B1 | 9/2004 | Lo et al. |
| 6,819,706 | B1 | 11/2004 | Lim |
| 6,922,561 | B2 | 7/2005 | Chen et al. |
| 6,963,750 | B1 | 11/2005 | Cheng et al. |
| 6,973,308 | B1 * | 12/2005 | Smith ............................ 455/436 |
| 7,006,469 | B1 | 2/2006 | Roark et al. |
| 7,065,361 | B1 | 6/2006 | Fortuna |
| 7,177,658 | B2 | 2/2007 | Willenegger et al. |
| 7,260,415 | B1 | 8/2007 | Oh |
| 7,349,699 | B1 | 3/2008 | Kelly et al. |
| 7,366,526 | B2 | 4/2008 | Zhang et al. |
| 7,693,526 | B2 | 4/2010 | Qian et al. |
| 7,768,998 | B1 | 8/2010 | Everson et al. |
| 7,782,964 | B1 * | 8/2010 | Talley et al. .................. 375/260 |
| 8,031,667 | B2 | 10/2011 | Kang et al. |
| 2003/0193917 | A1 * | 10/2003 | Song et al. .................... 370/335 |
| 2004/0008627 | A1 | 1/2004 | Garg et al. |
| 2004/0037264 | A1 | 2/2004 | Khawand |
| 2004/0125768 | A1 | 7/2004 | Yoon et al. |
| 2004/0192306 | A1 | 9/2004 | Elkarat et al. |
| 2004/0224719 | A1 | 11/2004 | Nounin et al. |
| 2005/0181802 | A1 * | 8/2005 | Utakouji ....................... 455/453 |
| 2005/0261899 | A1 | 11/2005 | Brueck et al. |
| 2006/0058056 | A1 | 3/2006 | Das et al. |
| 2006/0094423 | A1 | 5/2006 | Sharma et al. |
| 2006/0116125 | A1 | 6/2006 | Buckley et al. |
| 2006/0142032 | A1 | 6/2006 | Derakhshan et al. |
| 2006/0142051 | A1 | 6/2006 | Purnadi et al. |
| 2006/0160551 | A1 | 7/2006 | Matoba et al. |
| 2006/0174015 | A1 | 8/2006 | Arauz-Rosado |
| 2006/0274685 | A1 | 12/2006 | Johnson et al. |
| 2007/0043558 | A1 | 2/2007 | Schwarz et al. |
| 2007/0053336 | A1 | 3/2007 | Petrovic et al. |
| 2007/0105535 | A1 | 5/2007 | Jacobson et al. |
| 2007/0173252 | A1 | 7/2007 | Jiang |
| 2008/0025235 | A1 | 1/2008 | Mahany et al. |
| 2008/0032713 | A1 | 2/2008 | Yang |
| 2008/0081623 | A1 | 4/2008 | Burgan et al. |
| 2008/0096520 | A1 | 4/2008 | Benco et al. |
| 2008/0233945 | A1 | 9/2008 | Gummadi et al. |
| 2008/0293419 | A1 | 11/2008 | Somasundaram et al. |
| 2008/0293437 | A1 | 11/2008 | Ranganathan et al. |
| 2009/0016328 | A1 | 1/2009 | Peisa et al. |
| 2009/0061854 | A1 | 3/2009 | Gillot et al. |
| 2009/0227277 | A1 | 9/2009 | Gupta et al. |
| 2009/0247137 | A1 | 10/2009 | Awad |
| 2009/0285113 | A1 | 11/2009 | Yavuz et al. |
| 2010/0120418 | A1 | 5/2010 | Agarwal |
| 2010/0120437 | A1 | 5/2010 | Foster et al. |
| 2010/0268674 | A1 | 10/2010 | Dwyer et al. |
| 2010/0311420 | A1 | 12/2010 | Reza et al. |
| 2011/0021197 | A1 | 1/2011 | Ngai |
| 2011/0034167 | A1 | 2/2011 | Ben-Shaul et al. |

OTHER PUBLICATIONS

Shah et al., U.S. Appl. No. 12/553,661, filed Sep. 3, 2009, 33 pages.
Oroskar et al., U.S. Appl. No. 12/558,359, filed Sep. 11, 2009, 36 pages.
Oroskar et al., U.S. Appl. No. 12/572,829, filed Oct. 2, 2009, 40 pages.
Vargantwar et al., U.S. Appl. No. 12/690,629, filed Jan. 20, 2010, 38 pages.
Oroskar et al., U.S. Appl. No. 12/756,027, filed Apr. 7, 2010, 34 pages.
Oroskar et al., U.S. Appl. No. 12/776,287, filed May 7, 2010, 36 pages.
Oroskar et al., U.S. Appl. No. 12/786,174, filed May 24, 2010, 42 pages.
Oroskar et al., U.S. Appl. No. 12/786,184, filed May 24, 2010, 42 pages.
Oroskar et al., U.S. Appl. No. 12/854,119, filed Aug. 10, 2010, 54 pages.
Cai, L et al., "Mitigating DoS Attacks on the Paging Channel by Efficient Encoding in Page Messages," In:Proceedings of 5th International ICST Conference on Security and Privacy in Communication Networks (SecureComm 2009), Sep. 2009.
Oroskar et al., U.S. Appl. No. 12/853,730, filed Aug. 10, 2010, 48 pages.
Vargantwar et al., U.S. Appl. No. 12/815,700, filed Jun. 15, 2010, 41 pages.
Vargantwar et al., U.S. Appl. No. 12/815,709, filed Jun. 15, 2010, 42 pages.
Vargantwar et al., U.S. Appl. No. 12/847,198, filed Jul. 30, 1010, 36 pages.
Oroskar, Siddharth S., U.S. Appl. No. 12/909,165, filed Oct. 21, 2010, 35 pages.
Vondekamp et al., U.S. Appl. No. 11/535,870, filed Sep. 27, 2006, 29 pages.
Oroskar et al., U.S. Appl. No. 12/854,114, filed Aug. 10, 2010, 48 pages.
Office Action for U.S. Appl. No. 11/535,870 dated Apr. 3, 2009, 14 pages.
Final Office Action for U.S. Appl. No. 11/535,870 dated Nov. 12, 2009, 22 pages.
Advisory Action for U.S. Appl. No. 11/535,870 dated Feb. 18, 2010, 14 pages.
Office Action for U.S. Appl. No. 12/853,730 dated Jan. 18, 2012, 13 pages.
Office Action for U.S. Appl. No. 12/815,700 dated Dec. 14, 2011, 9 pages.
Office Action for U.S. Appl. No. 12/815,709 dated Feb. 21, 2012, 5 pages.
TIA Standard, "Interoperability Test Specification for cdma2000® Air Interface," TIA-1036, Section 3.11, Jan. 2005.
TR45, "Inter-Operability Specification (IOS) for CDMA 2000 Access Network Interfaces," TIA/EIA/IS-2001-A, Sections 2.2.2.2, 3.4.1, 3.4.3.1.11, and 3.4.9, Jun. 2001.
3rd Generation Partnership Project 2 "3GPP2", "Source-Controlled Variable-Rate Multimode Wideband Speech Codec (VMR-WB), Service Options 62 and 63 for Spread Spectrum Systems," 3GPP2 C.S0052-A, Version 1.0, Apr. 22, 2005, 198 pages.
Hasswa et al., "Generic Vertical Handoff Decision Function for Heterogeneous Wireless Networks," IFIP Int. Conf. Wireless and Optical Communications Network (WOCN), pp. 739-243 (Mar. 6, 2005).
NTT DoCoMo et al., "Idle Mode Mobility Control Principles," 3GPP TSG RAN WG2 #59BIS; 3GPP Draft; R2-074001, 8 pages, Oct. 8-12, 2007.
NTT DoCoMo et al., "Load Balancing Solutions for LTE," 3GPP TSG RAN WG2 #58bis; 3GPP Draft; R2-072719, 5 pages, Jun. 22, 2007.
International Search Report and Written Report for PCT/US2012/028070 mailed May 7, 2012, 15 pages.
"Enhanced Variable Rate Codec, Speech Service Options 3, 68, 70, and 73 for Wideband Spread Spectrum Digital Systems," 3GPP2 C.S0014-D, Version 1, pp. 1-1 through 9-24 (May 2009).
CouthIT, "EVRC-A," 1 page, May 18, 2012 (www.couthit.com/codec-evrc.asp).
CouthIT, "EVRC-B," 1 page, May 18, 2012 (www.couthit.com/codec-evrc.asp).
CouthIT, "EVRC-NW," 2 pages, May 18, 2012 (www.couthit.com/codec-evrc.asp).
CouthIT, "EVRC-C, EVRC-WB," 2 pages, May 18, 2012 (www.couthit.com/codec-evrc.asp).
Desineni et al., "RTP Payload Format for the Enhanced Variable Rate Wideband Codec (EVRC-WB) and the Media Subtype Updates for EVRC-B Codec," Network Working Group, pp. 1-25 (Feb. 2008).

* cited by examiner

ASSIGNING TRAFFIC CHANNELS TO A WIRELESS COMMUNICATION DEVICE BASED ON TRAFFIC CHANNEL UTILIZATION

BACKGROUND

In wireless networking, a wireless communication device (WCD) may be assigned resources of at least one wireless coverage area. Using these resources, the WCD may communicate with a radio access network (RAN), as well as other devices. In some deployments, the RAN may define wireless coverage areas on more than one frequency. Further, the wireless coverage areas defined on different frequencies may exhibit different utilizations.

OVERVIEW

The wireless coverage areas of a RAN may be defined by one or more base transceiver stations (BTSs). Each BTS may take the form of a wireless access point, antenna, and/or radio tower that determines, at least to some extent, the physical coverage of its wireless coverage area(s). The same BTSs may define different wireless coverage areas on different frequencies. Thus, these wireless coverage areas may have similar physical coverage characteristics.

In some situations, a RAN may determine that the utilization of one or more wireless coverage areas defined on a particular frequency meets a utilization threshold. For instance, these wireless coverage areas may be 50%, 60%, 70%, 80%, or 90% utilized. Nonetheless, a WCD may be well within range of these wireless coverage areas, perhaps receiving signals at or above a threshold signal strength from a particular wireless coverage area. Possibly based on these factors, the RAN may seek to assign the WCD a target wireless coverage area defined on a different frequency, by the one of the BTSs that defines the wireless coverage areas on the particular frequency. In this way, the WCD is likely to be assigned a wireless coverage area that provides reasonably good coverage but may not exhibit the high utilization of at least one of the wireless coverage areas defined on the particular frequency.

Thus, in a first example embodiment, a RAN may receive a call establishment request seeking to establish a call involving a WCD. The RAN may receive the call establishment request on a first frequency. In response to receiving the call establishment request, the RAN may select a plurality of wireless coverage areas, each defined using the first frequency. The RAN may determine that utilization of a first wireless coverage area of the selected wireless coverage areas meets a utilization threshold. In response to determining that utilization of the first wireless coverage area meets the utilization threshold, the RAN may determine whether a strength at which the WCD receives signals from the first wireless coverage area exceeds the strengths at which the WCD receives signals from other wireless coverage areas in the plurality of wireless coverage areas by at least a signal strength differential value.

In the case that the strength at which the WCD receives signals from the first wireless coverage area exceeds the strengths at which the WCD receives signals from the other wireless coverage areas by at least the signal strength differential value, the RAN may assign, to the WCD, a traffic channel from a second wireless coverage area for supporting the call. The second wireless coverage area may be defined on a second frequency. If the strength at which the WCD receives signals from the first wireless coverage area does not exceed the strengths at which the WCD receives signals from the other wireless coverage areas by at least the signal strength differential value, the RAN may assign, to the WCD, traffic channels from at least some of the other wireless coverage areas. The WCD may use these assigned traffic channels during the call.

In a second example embodiment, a RAN may receive a call establishment request seeking to establish a call involving a WCD. The RAN may receive the call establishment request on a first frequency. In response to receiving the call establishment request, the RAN may select a plurality of wireless coverage areas, each defined using the first frequency. The RAN may determine that utilization of a first wireless coverage area of the selected wireless coverage areas meets a utilization threshold. In response to determining that utilization of the first wireless coverage area meets the utilization threshold, the RAN may determine that a strength at which the WCD receives signals from the first wireless coverage area exceeds each strength at which the WCD receives signals from other wireless coverage areas in the plurality of wireless coverage areas by at least a signal strength differential value. Based on this determination, the RAN may assign, to the WCD, a traffic channel from a second wireless coverage area. The second wireless coverage area may be defined using a second frequency. The WCD may use these assigned traffic channels during the call.

A third example embodiment may include a non-transitory computer-readable storage medium, having stored thereon program instructions that, upon execution by a RAN device, cause the RAN device to perform functions in accordance with the first and/or second example embodiments.

A fourth example embodiment may include a RAN device, comprising a processor and data storage. The data storage may contain program instructions executable by the processor to cause the RAN device to operate in accordance with the first and/or second example embodiments.

The foregoing overview is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems, devices, and methods with reference to the accompanying figures. The illustrative system, device, and method embodiments described herein are not meant to be limiting. It may be readily understood that certain aspects of the disclosed systems, devices, and methods can be arranged and combined in a wide variety of different configurations, all of which are contemplated herein.

FIGS. 1-4 describe example network and computing device architectures and configurations. It should be understood that network arrangements shown in FIGS. 1-4 and other arrangements described herein are set forth only as examples. As such, alternative arrangements and elements (e.g., machines, interfaces, functions, orders, and groupings of functions, etc.) can be used instead, and some elements may be omitted altogether. Further, many of the elements described herein may be functional entities implemented as discrete or distributed components or in conjunction with other components, and in any suitable combination and location. In addition, various functions described herein as being performed by one or more entities may be carried out by hardware, firmware, and/or software.

I. Network Architecture

Figure 1:
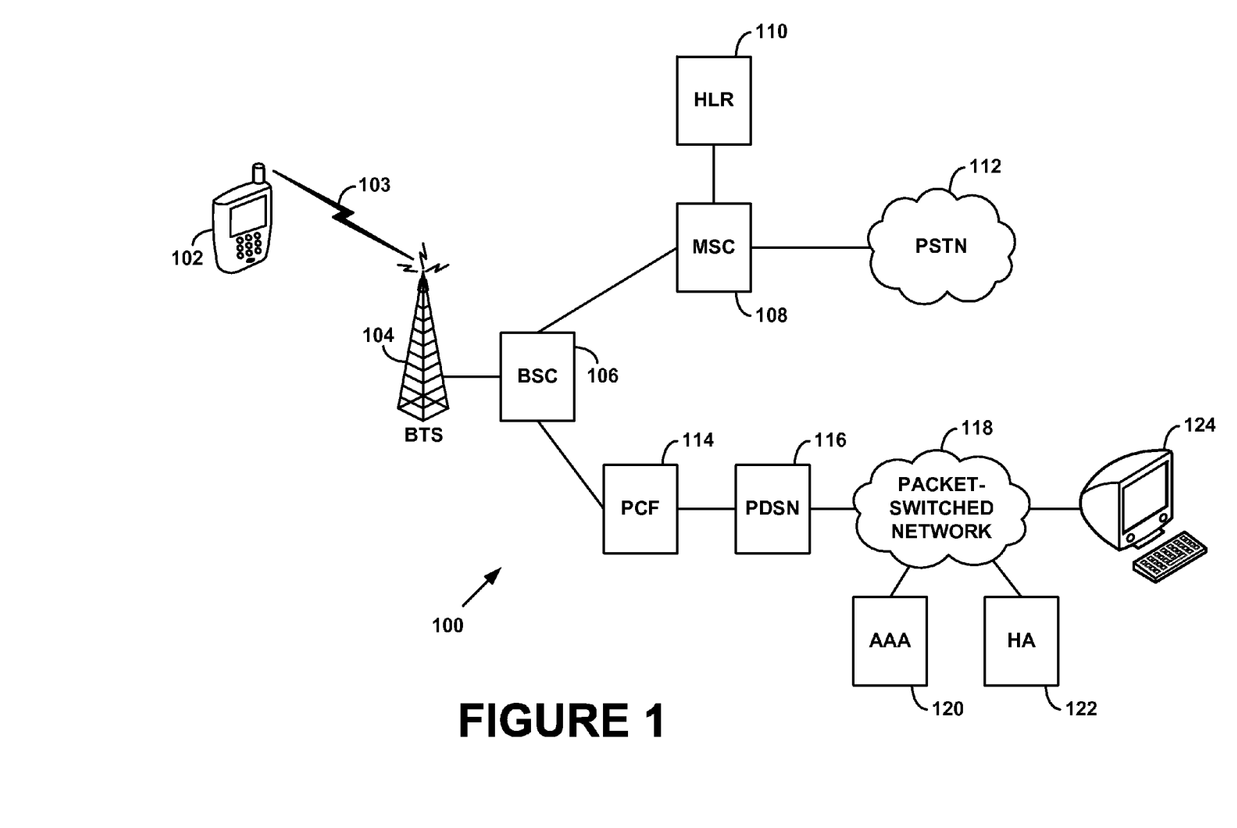
FIG. 1 illustrates a RAN, in accordance with an example embodiment.

FIG. 1 shows a simplified block diagram of a wireless communication system 100 in which example embodiments can be employed. WCD 102 may communicate over an air-interface 103 with a BTS 104, which is, in turn, coupled to or integrated with a BSC 106. Transmissions over air-interface 103 from BTS 104 to WCD 102 may represent a "forward link" to WCD 102. Conversely, transmissions over air-interface 103 from WCD 102 to BTS 104 may represent a "reverse link" from WCD 102. WCD 102 can be, for example, a cell phone, a laptop, a tablet computing device, an embedded transceiver, etc.

BSC 106 may be connected to a mobile switching center (MSC) 108. BSC 106, MSC 108, or both, may act to control assignment of air-interface traffic channels to WCDs, and may provide access to wireless circuit-switched services such as circuit-voice and circuit-data services. As represented by its connection to publically-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a mobile-IP home agent (HA) 122, and a remote computer 124. After acquiring a traffic channel over air-interface 103, WCD 102 may transmit a request to PDSN 116 for a connection to the packet data network. Then, following authentication of WCD 102 by AAA server 120, WCD 102 may be assigned an IP address by PDSN 116 or by HA 122, and may thereafter engage in packet-data communications with entities such as remote computer 124.

In some deployments, the combination of elements including BTS 104, BSC 106, and MSC 108 may be referred to as a RAN. However, a RAN may contain more or fewer elements. For instance, some RANs may also include HLR 110, PCF 114, PDSN 116, and/or other elements not shown in FIG. 1.

Figure 2:
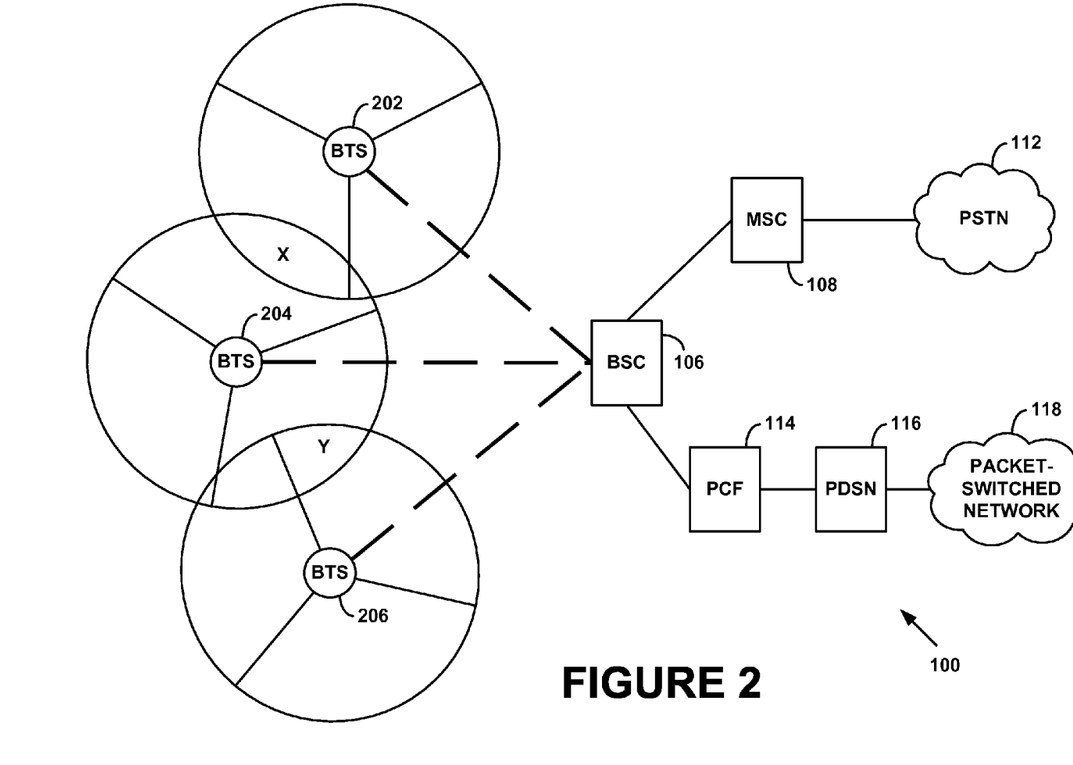
FIG. 2 depicts a RAN radiating to define several wireless coverage areas, in accordance with an example embodiment.

In practice, a BSC may serve multiple BTSs, each of which may then radiate to define one or more wireless coverage areas. This arrangement is illustrated in FIG. 2, which shows BSC 106 in network 100 coupled with BTSs 202, 204, and 206. Each BTS is shown at the core of a respective circle representing wireless coverage, and each circle is divided into three pie-shaped pieces representing wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas for each of the BTSs in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, wireless coverage areas need not be pie-shaped, and may take on other shapes and arrangements instead.

A WCD may transmit and/or receive the same signals substantially simultaneously via or through more than one wireless coverage area. Herein, the term "substantially simultaneously" may be used to describe communications involving two or more discrete messages that pass through two or more different intermediate points at approximately the same time, such as within a few tens of milliseconds or less. To illustrate that point, FIG. 2 includes points X and Y. While in the vicinity of point X, a WCD may be able to transmit and/or receive signals substantially simultaneously from wireless coverage areas of BTS 202 and BTS 204. Similarly, while in the vicinity of point Y, a WCD may be able to transmit and/or receive signals substantially simultaneously from wireless coverage areas of BTS 204 and BTS 206. It should be noted that, in practice, a WCD located at or near points X or Y may be able to transmit and/or receive signals substantially simultaneously from more than two wireless coverage areas. This substantially simultaneously communication may include bearer as well as signaling traffic.

In general, the depictions of both FIGS. 1 and 2 are illustrative. Thus, the particular arrangement shown in FIG. 1 should not be viewed as limiting with respect to the present embodiments. For instance, BSC 106 may be replaced by one or more radio network controllers (RNCs), and MSC 108 may be replaced, in whole or in part, by one or more softswitch and/or media gateway components.

Figure 3:
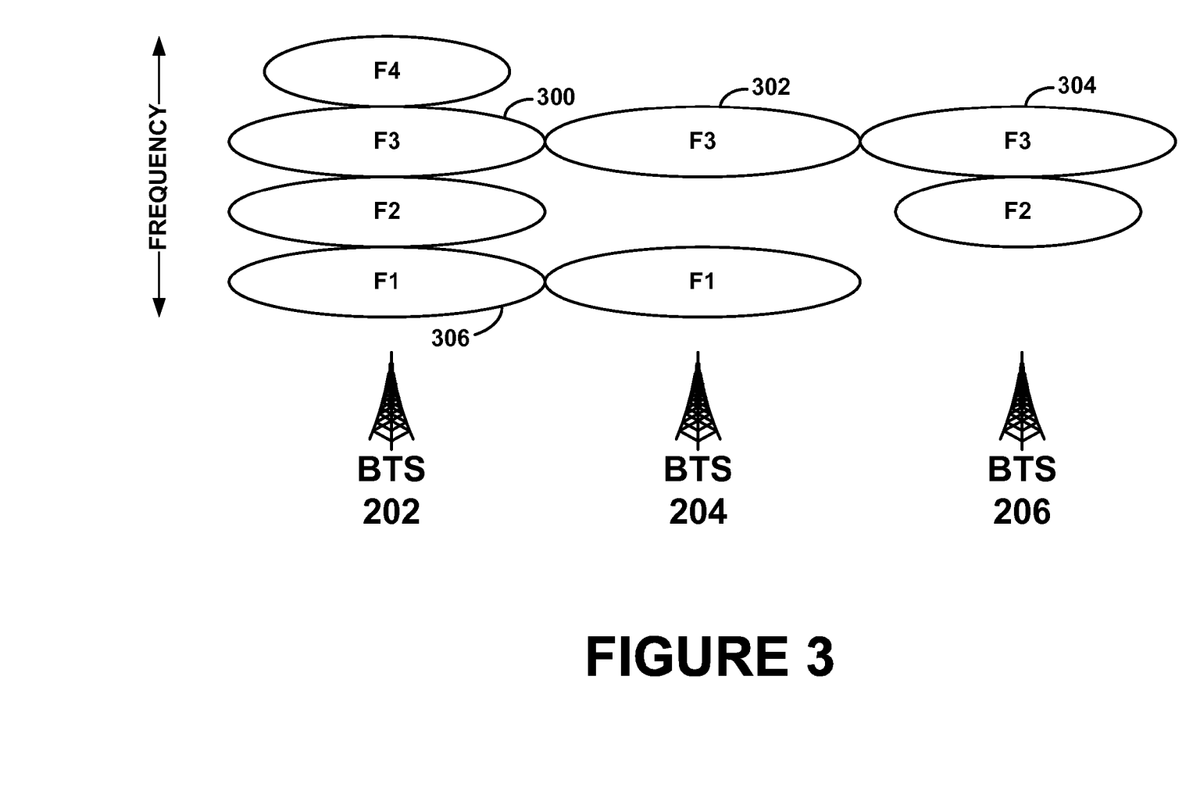
FIG. 3 depicts a number of wireless coverage areas defined on various frequencies, in accordance with an example embodiment.

FIG. 3 depicts example wireless coverage areas defined by three BTSs, BTS 202, BTS 204, and BTS 206. BTS 202 defines four wireless coverage areas, one defined using each of frequencies F1, F2, F3, and F4. Preferably, these frequencies are separated by sufficiently large guard bands so that BTS 202 can communicate simultaneously with WCDs on each frequency without substantial interference from the other frequencies.

BTS 204 defines two wireless coverage areas, one defined using frequency F1 and the other defined using frequency F3. BTS 206 also defines two wireless coverage areas, one defined using frequency F2 and the other defined using frequency F3. As depicted in FIG. 3, frequency F1 may be a lower frequency than frequency F2, frequency F2 may be a lower frequency than frequency F3, and frequency F3 may be a lower frequency than frequency F4. However, other arrangements are possible without departing from the spirit of the embodiments herein.

BTS 202 and BTS 204 may be physically neighboring one another, and arranged to define at least some wireless coverage areas that provide continuous coverage across the physical locations covered by these BTSs. For example, BTS 202, BTS 204, and BTS 206 define wireless coverage areas on frequency F3. Furthermore, these BTSs define wireless coverage areas using frequencies F3 so that the wireless coverage areas using these frequencies are adjacent to one another.

As described above with respect to FIG. 2, a WCD, while in the vicinity of point X, may be able to transmit and/or receive signals substantially simultaneously from wireless coverage areas of BTS 202 and BTS 204. Similarly, while in the vicinity of point Y, the WCD may be able to transmit and/or receive signals substantially simultaneously from wireless coverage areas of BTS 204 and BTS 206. FIG. 2 does not show a point where a WCD can transmit and/or receive signals substantially simultaneously from wireless coverage areas of BTS 202, BTS 204, and BTS 206. However, for the following examples it is assumed that there is point where the WCD can communicate through wireless coverage areas of all three BTSs substantially simultaneously. Thus, the WCD may be assigned traffic channels from wireless coverage areas defined by BTS 202, BTS 204, and BTS 206 on F3, for example.

During a call, a WCD may communicate substantially simultaneously via a number of "active" wireless coverage areas at a time. Depending on the type and/or configuration of the RAN, the number of active wireless coverage areas may be from one to six. However, more than six active wireless coverage areas may be used without departing from the scope of these embodiments. The WCD may maintain a list of the active wireless coverage areas. This list may be referred to as the WCD's "active set." For instance, an active set for the WCD may include a first wireless coverage area 300 associated with BTS 202 on frequency F3, a second wireless coverage area 302 associated with BTS 204 on frequency F3, and a third wireless coverage area 304 associated with BTS 206 on frequency F3. The RAN may determine that utilization of first wireless coverage area 300 meets a utilization threshold (e.g., exceeds a traffic channel utilization threshold of 80%). In response to determining that utilization of first wireless coverage area 300 meets the utilization threshold, the RAN may determine that a strength at which the WCD receives signals from first wireless coverage area 300 exceeds respective signal strengths at which the WCD receives signals from second and third wireless coverage areas 302 and 304 by at least a signal strength differential value. Accordingly, the RAN may assign, to the WCD, a traffic channel from another wireless coverage area 306 associated with BTS 202 on a different frequency, such as F1, for supporting the call.

Because the signal strength received from first wireless coverage area 300 of BTS 202 is high relative to the second and third wireless coverage areas 302 and 304, it is likely that the WCD receives signals from wireless coverage area 306 also at a relatively high strength. Generally, a signal of lower frequency may propagate further than another signal of higher frequency, assuming both signals have the same power. Thus, assuming that F1 is lower than F3, the WCD may receive signals from wireless coverage area 306 at a strength that is at least as strong as signal received via wireless coverage area 300, since both wireless coverage areas 300 and 306 are defined by BTS 202, and are defined using the same or similar amounts of power.

Thus, a call established with the WCD via communication through wireless coverage area 306 on frequency F1 is likely to be reliable and have a high quality. In this case, simultaneous communication through other wireless coverage areas may not be necessary to improve call quality.

If the strength at which the WCD receives signals from first wireless coverage area 300 does not exceed the respective signal strengths at which the WCD receives signals from the second and third wireless coverage areas 302 and 304 by at least the signal strength differential value, the RAN may assign the WCD traffic channels from second and third wireless coverage areas 302 and 304. In some embodiments, first wireless coverage area 300 may be removed from the active set selected for the WCD.

This approach may provide a balance between call setup reliability and traffic channel resource balancing. First wireless coverage area 300 may be loaded (i.e., its utilization exceeds a threshold utilization) and hence unable or unlikely to be able to sustain another call. However, the strength of signals received at the WCD from first wireless coverage area 300 may be higher than signal strengths received from second and third wireless coverage areas 302 and 304 by a margin. Therefore, the RAN may assign traffic channels from another wireless coverage area of BTS 202, such as wireless coverage area 306.

Alternatively, in other scenarios, the strength of signals received from first wireless coverage area 300 may not exceed signal strengths received from second and third wireless coverage areas 302 and 304 by the margin. In this case, the RAN may assign the WCD traffic channels from second and third wireless coverage areas 302 and 304.

It should be understood that each wireless coverage area defined by a given BTS may be of a different size and/or shape. For instance, as depicted in FIG. 3, the wireless coverage area defined by BTS 202 on frequency F4 may be smaller than the other wireless coverage areas defined by BTS 202. Similarly, the wireless coverage area defined by BTS 206 on frequency F2 may be smaller than the wireless coverage area defined by BTS 206 on frequency F3.

A wireless network operator may determine the number of wireless coverage areas for a given BTS based on the wireless network traffic expected or observed near the given BTS. BTSs located in or near a physical location with a high population density may be arranged to define a relatively large number of wireless coverage areas, while BTSs located in or near a physical location with a low population density may define a relatively small number of wireless coverage areas. Thus, for instance, BTS 202 may be in a densely populated area exhibiting a large number of WCDs that generate a large amount of total wireless network traffic, because it defines four wireless coverage areas. However, BTS 204 and BTS 206 may be in less densely populated areas where fewer WCDs generate less total wireless network traffic. Thus, each of these BTSs only defines two wireless coverage areas.

While mobile wireless communication may occur on virtually any frequency, some frequencies are more commonly used for this purpose than others. For example, the frequency bands of 698-960 MHz, 1610-2025 MHz, 2110-2200 MHz and 2400-2690 MHz are typically used by wireless service providers in the United States. An individual wireless service provider's spectrum may be split over one or more of these ranges (or over any other applicable ranges). Thus, for example, frequency F1 may be in the 698-960 MHz range, frequency F2 may be in the 1610-2025 MHz range, frequency F3 may be in the 2110-2200 MHz range, and frequency F4 may be in the 2400-2690 MHz range. Alternatively, any number of these frequencies may be in the same range, e.g., frequencies F1, F2, F3, and F4 may all be in the 698-960 MHz range. In general, any of frequencies F1, F2, F3, and F4 may be in any of these ranges, or in other ranges.

II. RAN Device

Figure 4:
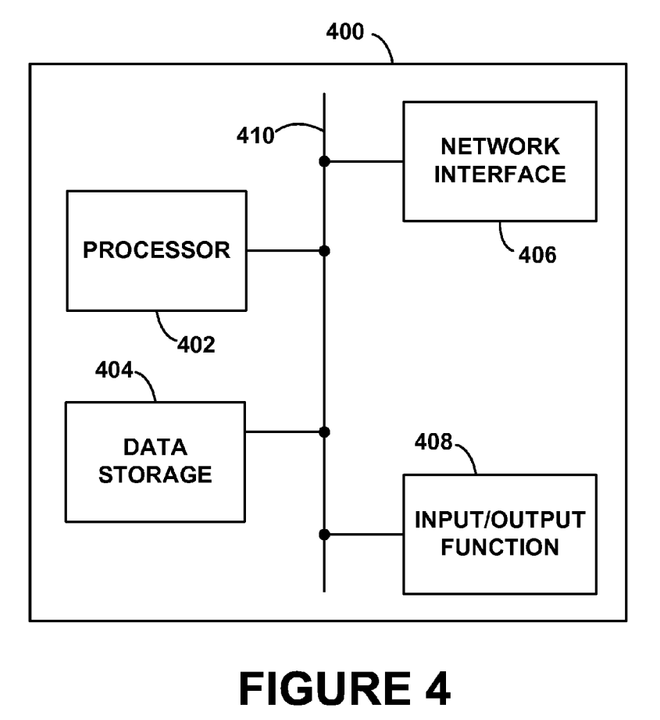
FIG. 4 is a block diagram of a RAN device, in accordance with an example embodiment.

FIG. 4 is a block diagram of an example RAN device 400, illustrating some of the functional components that could be included in a RAN device arranged to operate in accordance with the embodiments herein. Example RAN device 400 could be any type of device found in or associated with a RAN, such as a BTS, a BSC, an MSC, etc. Particularly, RAN device 400 may include features of a general purpose computing device, as well as RAN-related features. Thus, it should be understood that the description of RAN device 400 could apply to one or more components used for the purposes described herein.

In this example, RAN device 400 includes a processor 402, a data storage 404, a network interface 406, and an input/output function 408, all of which may be coupled by a system bus 410 or a similar mechanism. Processor 402 can include one or more CPUs, such as one or more general purpose processors and/or one or more dedicated processors (e.g., application specific integrated circuits (ASICs) or digital signal processors (DSPs), etc.).

Data storage 404, in turn, may comprise volatile and/or non-volatile data storage and can be integrated in whole or in part with processor 402. Data storage 404 can hold program instructions, executable by processor 402, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 404 may contain program instructions, perhaps stored on a non-transitory computer-readable medium, executable by processor 402 to carry out any of the methods, processes, or functions disclosed in this specification or the accompanying drawings.

Network interface 406 may take the form of a wireline connection, such as an Ethernet, Token Ring, or T-carrier connection. Network interface 406 may also take the form of a wireless connection, such as IEEE 802.11 (Wifi), BLUETOOTH®, or a wide-area wireless connection. However, other forms of physical layer connections and other types of standard or proprietary communication protocols may be used over network interface 406. Furthermore, network interface 406 may comprise multiple physical interfaces.

Input/output function 408 may facilitate user interaction with example RAN device 400. Input/output function 408 may comprise multiple types of input devices, such as a keyboard, a mouse, a touch screen, and so on. Similarly, input/output function 408 may comprise multiple types of output devices, such as a monitor, printer, or one or more light emitting diodes (LEDs). Additionally or alternatively, RAN device 400 may support remote access from another device, via the network interface 406 or via another interface (not shown), such an RS-232 or USB port.

III. CDMA Communications

For purposes of illustration, an example embodiment that uses CDMA communications will be described. However, it should be understood that other examples could use other protocols and/or functions now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may simultaneously communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air-interface communications in a wireless coverage area may be divided into forward link communications and reverse link communications. On the forward link, certain Walsh codes may be reserved for defining control channels, including a pilot channel, a sync channel, and one or more paging channels, and the remainder may be allocated dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be allocated dynamically to WCDs for use as traffic channels.

Channel assignment to WCDs, which typically involves allocating one or more resources of a wireless coverage area to the WCDs, may occur when a new call (e.g., a voice, video, music, and/or data session) is established involving the WCD, or when the WCD hands off to a different wireless coverage area.

a. Idle Handoff and Call Establishment

Each BTS of a RAN may emit a pilot channel signal in each wireless coverage area the respective BTS defines. Based on these pilot channel signals, an idle WCD (e.g., a WCD not involved in a call) may associate with a primary wireless coverage area, and then listen to the paging channel of the primary wireless coverage area for incoming call indications, and other information, from the RAN. The RAN may transmit system parameter messages and/or neighbor list update messages to the WCD via this primary paging channel. These messages may identify PN offsets of the pilot channels emitted by BTSs that define neighboring wireless coverage areas (e.g., wireless coverage areas defined by the RAN's BTSs or wireless coverage areas defined by nearby BTSs in different RANs).

An idle WCD may measure the pilot channel signal strength that it receives from each of these neighboring wireless coverage areas. If, for some period of time, the WCD receives pilot channel signals from a neighboring wireless coverage area at a sufficiently greater strength than the WCD receives pilot channel signals from the primary wireless coverage area, the WCD may hand off to the neighboring wireless coverage area. To do so, the WCD may stop listening to the primary wireless coverage area's paging channel and associate with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer traffic to the RAN on a reverse traffic channel by applying the WCD's assigned PN long code offset to a PN long code. The WCD may then modulate the bearer traffic according to the resulting point in the PN long code.

b. Soft Handoff

The WCD may maintain a list of the active wireless coverage areas (the active set), identified according to their PN offsets. A RAN may be arranged to transmit the same bearer data to a particular WCD concurrently via some or all of the wireless coverage areas in a particular WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion.)

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but are in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

The WCD may continuously, or from time to time, measure the strength of each pilot channel signal that it receives and may notify the RAN when a received pilot strength is above or below designated thresholds. More particularly, the BTS may provide the WCD with a handoff direction message (HDM), which indicates (i) the PN offsets of the wireless coverage areas in the WCD's active set, and (ii) the following handoff parameters that relate to pilot signal strength:

T_ADD: Threshold pilot strength for addition to the active set (e.g., −14 decibels (dB))

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The WCD may then monitor the pilot signals that it receives, measuring signal strength for each as $E_c/I_o$, where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a pilot strength measurement message (PSMM) to the BSC with information indicative of the identity of the wireless coverage area. If the pilot strength exceeds any active wireless coverage area signal by T_COMP, the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set is a soft handoff.

If the WCD detects that the signal strength of a pilot channel in its active set drops below T_DROP, the WCD starts a handoff drop timer. If T_TDROP passes without this signal strength exceeding T_DROP, the WCD may then transmit a PSMM to the BSC, indicating the wireless coverage area and the detected $E_c/I_o$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating, the WCD may be transmitting and/or receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

c. Channel Assignment

Figure 5:
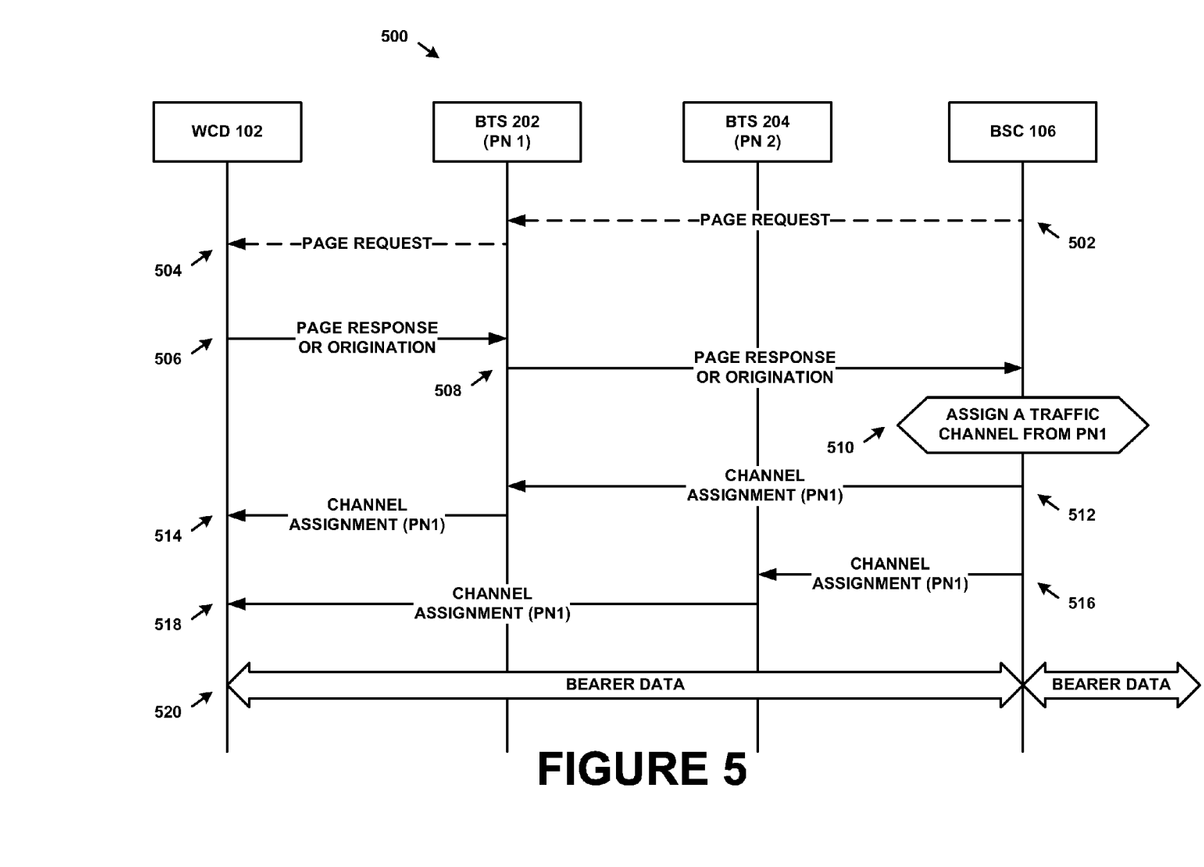
FIG. 5 is a first message flow diagram, in accordance with an example embodiment.

For purposes of illustration, FIG. 5 shows an example message flow 500 of a RAN transmitting channel assignment messages via multiple wireless coverage areas during call establishment. FIG. 5 involves WCD 102, BTS 202, BTS 204, and BSC 106. BTS 202 defines a wireless coverage area with PN offset 1 ("PN 1"), and BTS 204 defines another wireless coverage area with PN offset 2 ("PN 2").

BTS 202 and BTS 204 may be controlled by BSC 106. WCD 102 may be able to receive pilot channel signals of sufficient strength from both PN 1 and PN 2 such that WCD 102 could communicate effectively via either of these wireless coverage areas. Without loss of generality, it is assumed that PN 1 is the primary wireless coverage area of WCD 102.

WCD 102 may report, to BSC 106, measurements of the signal strengths at which WCD 102 receives the pilot channels of PN 1 and PN2. This reporting may occur through the transmission of radio environment reports or pilot strength measurement messages (PSMMs), or via a different type of message.

Steps 502 and 504 illustrate BSC 106, via BTS 202, transmitting an optional page request message to WCD 102. Such a page request message may be transmitted when WCD 102 is paged to answer an incoming voice call or to receive incoming data. Steps 506 and 508 illustrate WCD 102 transmitting a message via BTS 202 to BSC 106. This message may be a page response message transmitted on the access channel in response to the optional page request message. Alternatively, this message may be an origination message, also transmitted on the access channel, with which WCD 102 attempts to establish an outgoing voice or data call. Additional alternative message types may also be used for this purpose, and any such message may be transmitted on the access channel or another type of channel.

Regardless of whether an incoming or outgoing call is being established for WCD 102, at step 510, BSC 106 may assign a traffic channel to WCD 102. In a possible scenario, BSC 106 may assign a traffic channel from PN 1. When making the traffic channel assignment, BSC 106 may consider pilot channel signal strength measurements that it received from WCD 102. These considerations may be based on, for example, just the most recently-received measurement, or several recently received measurements. BSC 106 may use these received signal strengths, and/or other information, when determining from which wireless coverage area to assign a traffic channel. Thus, if BSC 106 determines that WCD 102 receives the pilot signal from PN 1 at a lower strength than that of PN 2, BSC 106 may instead assign a traffic channel from PN 2 to WCD 102.

At steps 512 and 514, BSC 106 may transmit a first channel assignment message via BTS 202 to WCD 102. The first channel assignment message may include a traffic channel assignment for PN 1. In other words, the first channel assignment message may instruct WCD 102 to use a particular Walsh code to receive from PN 1. Similarly, at steps 516 and 518, BSC 106 may transmit a second channel assignment message via BTS 204 to WCD 102. The second channel assignment message may also include a traffic channel assignment for PN 1 (thus, these two channel assignment messages may serve to assign the same channel). By transmitting multiple channel assignment messages to WCD 102 via different wireless coverage areas, the likelihood that WCD 102 receives at least one of these messages is increased. Regardless, at step 520, WCD 102 may begin receiving bearer traffic via BTS 202 (using PN 1). These multiple channel assignment messages may be transmitted to WCD 102 substantially simultaneously. Transmitting multiple channel assignments substantially simultaneously to a particular WCD to assign the same channel may be referred to as Access Handoff (AHO).

While message flow 500 shows only two channel assignment messages are being transmitted to WCD 102, more or fewer channel assignment messages may be transmitted to WCD 102 without departing from the scope of these embodiments. Further, throughout message flow 500, the names of these messages are used for purposes of convenience and messages with other names may be used for similar purposes.

d. Substantially Simultaneous Transmission of Bearer Data

As described in Section IIIb, when the RAN substantially simultaneously communicates bearer data with a WCD via more than one wireless coverage area, the RAN and WCD may be able to engage in soft handoff procedures. Soft handoff may result in fewer dropped calls and a higher overall call quality, especially if the WCD is in motion.

Channel Assignment into Soft Handoff (CASHO) has been proposed as a way of assignment multiple traffic channels from different wireless coverage areas to a WCD during call establishment. Thus, using CASHO procedures may increase the reliability and quality of the initial portions of the calls.

Figure 6:
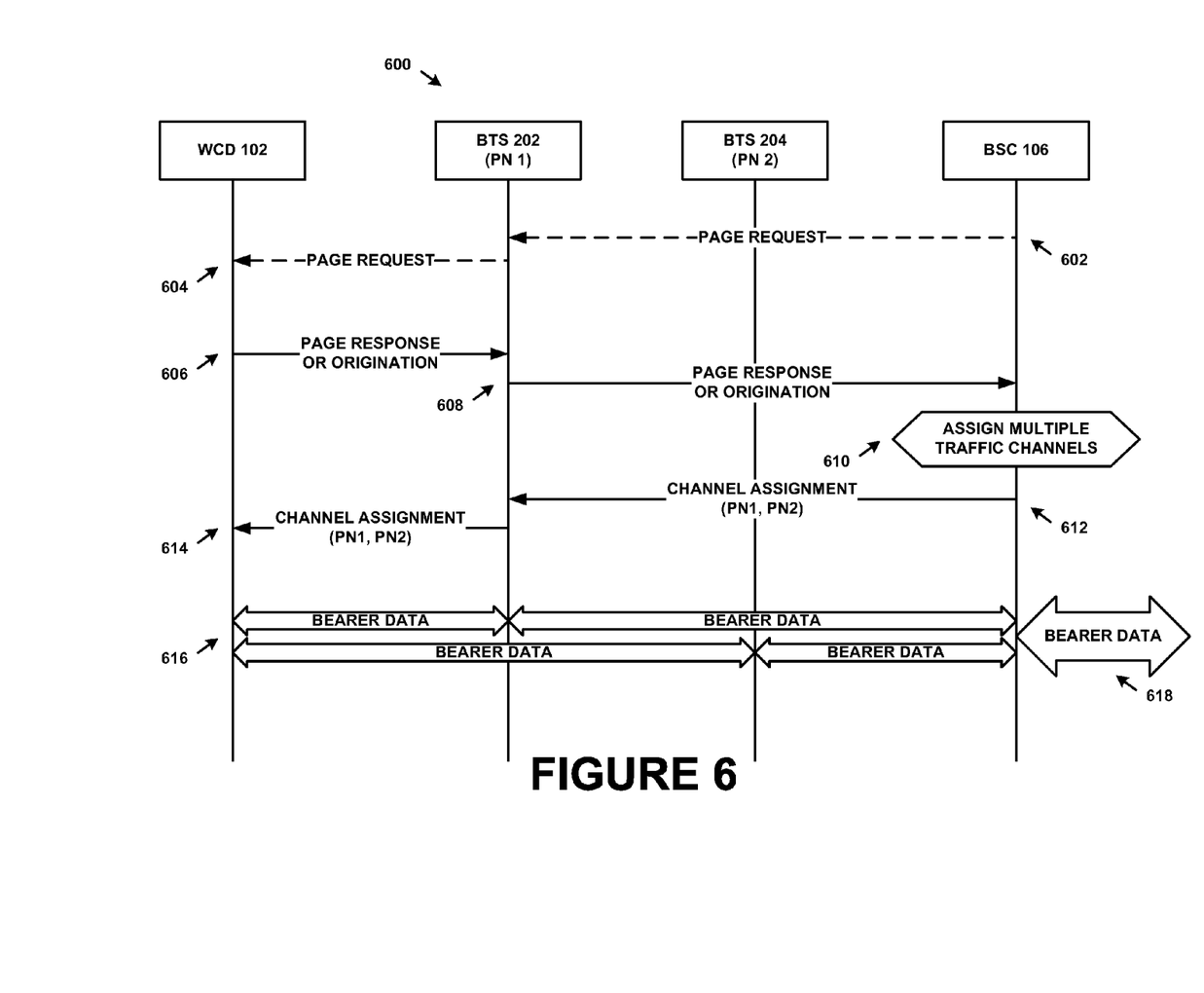
FIG. 6 is second message flow diagram, in accordance with an example embodiment.

For purposes of illustration, FIG. 6 shows an example message flow 600 of a RAN and WCD engaging in CASHO procedures. Like FIG. 5, FIG. 6 involves WCD 102, BTS 202, BTS 204, and BSC 106.

Steps 602 and 604 illustrate BSC 106, via BTS 202, transmitting an optional page request message to WCD 102. Steps 606 and 608 illustrate WCD 102 transmitting a page response message or origination message via BTS 202 to BSC 106. At step 610, BSC 106 may assign multiple traffic channels to WCD 102. In particular, BSC 106 may assign one traffic channel from PN 1, and another traffic channel from PN 2, to WCD 102, in accordance with CASHO procedures. When making the traffic channel assignment, BSC 106 may consider pilot channel signal strength measurements that it received from WCD 102. BSC 106 may receive these signal strengths in radio environment reports or PSMMs, the page response or origination message of steps 606 and 608, or in some other type of message. In any case, BSC 106 may use these received signal strengths, and/or other information, when determining whether and/or how to perform CASHO procedures.

At steps 612 and 614, BSC 106 may transmit a channel assignment message via BTS 202 to WCD 102. The channel assignment message may include traffic channel assignments for both PN 1 and PN 2. In other words, the channel assignment message may instruct WCD 102 to use a particular Walsh code with PN 1 and another Walsh code with PN 2. Accordingly, at steps 616 and 618, WCD 102 may begin transmitting and receiving bearer data via both BTS 202 (using PN 1) and BTS 204 (using PN 2). Thus, via both BTS 202 and BTS 204, WCD 102 may receive forward direction bearer data streams from BSC 106, and may combine these streams into a single stream of bearer data. For example, WCD 102 may add the received signals from BTS 202 and BTS 204. Conversely, via both BTS 202 and BTS 204, BSC 106 may receive reverse direction bearer data streams from WCD 102, and may also combine these streams into a single stream of bearer data.

It should be understood that rather than traversing BTS 202, any of the page request messages, page response or origination messages, and/or channel assignment messages may instead traverse BTS 204, or both BTS 202 and BTS 204. Alternatively, BSC 106 may assign WCD 102 traffic channels from two different PNs defined by the same BTS. Further, the names of these messages are used for purposes of convenience and messages with other names may be used for similar purposes. Additionally, CASHO procedures may be performed such that more than two traffic channels are assigned to a WCD during call initiation. In some cases, AHO and CASHO procedures may be implemented together for the same call.

CASHO generally improves call quality during the initial portion of a call. The more traffic channels assigned to a WCD during CASHO procedures, the more likely the WCD's initial call quality will improve. As a consequence, it is usually beneficial to assign as many traffic channels as possible during CASHO procedures.

On the other hand, if the RAN is busy (e.g., simultaneously serving a large number of active WCDs), traffic channel resources may be scarce. Some WCDs might not need to be assigned a large number of traffic channels (e.g., five or more) in order to have a sufficient initial call quality. Further, if the RAN assigns a large number of traffic channels to these WCDs during CASHO procedures, other WCDs may be unable to obtain a sufficient number of traffic channels.

For instance, another WCD may be unable to obtain any traffic channels, and consequently may be unable to participate in a call. But even if this WCD is able to participate in a call, the RAN may assign the WCD a small number (e.g., only one or two) traffic channels. If these assigned traffic channels are unable to provide sufficient call quality to the WCD, the WCD's call quality might suffer, even as nearby WCDs are assigned far more traffic channels.

IV. Example Operations

Overall call quality may be improved if the RAN, during call establishment, allocates traffic channels to WCDs based on traffic channel utilization, signal strengths with which the WCD receives signals, and frequencies associated with wireless coverage areas. Herein, "utilization" may refer to a measurement of resource usage. Thus, a utilization of a communication channel may be a portion of the channel that is used by traffic. For example, if, over a period of time, a given channel is used by traffic half of the time, the channel can be said to have a utilization of 50%. Also, a traffic channel that is assigned to a WCD may be considered to be fully utilized. Thus, the utilization of a wireless coverage area may be represented as a percentage of traffic channels in that wireless coverage area that are assigned to WCDs. While utilizations may be expressed as percentages, utilizations may alternatively be expressed in other ways as well.

As an example, when the RAN is experiencing high traffic channel utilization (e.g., 50%, 60%, 70%, 80%, 90%, or more), it may be advantageous to limit the number of traffic channels assigned to any one WCD during call establishment. Doing so may increase the likelihood that traffic channels from any given wireless coverage area are available when needed by a WCD.

Thus, as traffic channel utilization increases, the number of traffic channels assigned during call establishment may be decreased. However, as traffic channel utilization decreases, the number of traffic channels assigned during call establishment may be increased. By maintaining an inversely proportional relationship between traffic channel utilization and traffic channels assigned during call establishment, the RAN may be able to reduce traffic channel utilization during periods of heavy load, but increase the initial quality of calls during periods of lighter load.

For instance, there may be multiple traffic channel utilization thresholds that the RAN uses to determine the extent of wireless coverage areas from which to assign traffic channels. Table 1 provides an example arrangement of traffic channel utilization thresholds mapped to a maximum number of wireless coverage areas. When the traffic channel utilization falls into a given range of Table 1, the RAN assigns no more than the associated number of wireless coverage areas. Thus, if the traffic channel utilization is above the 80% threshold, the RAN will assign a traffic channel from at most one wireless coverage area. If the traffic channel utilization is at or below the 80% threshold, but above the 70% threshold, the RAN will assign traffic channels from at most two wireless coverage areas. On the other hand, if the traffic channel utilization is at or below 40%, the RAN may assign traffic channels via an unlimited number of wireless coverage areas. In practice, however, the number of wireless coverage areas may be limited to the number of wireless coverage areas in range of the WCD.

TABLE 1

Basing the maximum number of wireless coverage areas to assign to a WCD on traffic channel utilization.

| Traffic Channel Utilization Range (x) | Max Wireless Coverage Areas |
|---|---|
| x > 80% | 1 |
| 80% ≥ x > 70% | 2 |
| 70% ≥ x > 60% | 3 |
| 60% ≥ x > 40% | 5 |
| 40% ≥ x | Unlimited |

Therefore, in an alternative embodiment, the RAN may determine the traffic channel utilization of one or more wireless coverage areas. Then, in a table or mapping containing multiple traffic channel utilizations, such as the one provided by Table 1, the RAN may look up a maximum number of wireless coverage areas from which to assign traffic channels to the WCD. The RAN may subsequently proceed to assign traffic channels from no more than this number of wireless coverage areas.

In addition to traffic channel utilization, the RAN may also consider the relative strengths at which a WCD receives pilot signals from candidate wireless coverage areas. For example, the RAN may allocate fewer traffic channels to the WCD if the RAN is able to allocate traffic channels in wireless coverage areas from which the WCD receives strong pilot signals. Conversely, the RAN may allocate more traffic channels to the WCD if the RAN is unable to allocate traffic channels in wireless coverage areas from which the WCD receives strong pilot signals. In this manner, the RAN may seek to ensure that the signal strengths, as received by the WCD, for each respective wireless coverage area assigned to the WCD, or an aggregate signal strength of multiple wireless coverage areas, meet a signal strength threshold. For instance, the signal strength threshold may be −10 dB. Thus, as an example, the RAN may only assign a wireless coverage area to the WCD if the WCD receives signals from the wireless coverage areas at −10 dB or more. Other signal strength thresholds could be used as well.

Furthermore, in addition to or in combination with taking utilization and signal strengths into consideration, the RAN may also take into account the frequency on which a given wireless coverage area communicates with WCDs to determine allocation of traffic channels to WCDs. For example, the RAN may select multiple wireless coverage areas as an active set for a WCD. Each wireless coverage area of the multiple wireless coverage areas may be defined using a first frequency. The RAN may determine whether utilization of a first wireless coverage area meets a utilization threshold. The first wireless coverage area may, for example, be a primary wireless coverage area with the highest signal strength received at the WCD. In response to determining that utilization of the first wireless coverage area meets the utilization threshold, the RAN may determine whether a strength at which a WCD receives signals from the first wireless coverage area exceeds each strength at which the WCD receives signals from other wireless coverage areas in the multiple of wireless coverage areas by at least a signal strength differential value (e.g., a differential value between 1 dB and 8 dB). If this is the case, the RAN may assign, to the WCD, a traffic channel from a second wireless coverage area, defined using a second frequency, for supporting the call. The first wireless coverage area and the second wireless coverage area may both be defined by a particular BTS of the RAN. If not, the RAN may assign, to the WCD, traffic channels from each of the other wireless coverage areas for supporting the call.

Table 2 provides an example arrangement of wireless coverage areas and signal strength with which the WCD receives signals from the wireless coverage areas. In the example of table 2, the WCD receives signals from the first wireless coverage area with a strength of −12 dB that is at least −8 dB higher than signal strength received from the second and third wireless coverage areas. In this case, the RAN may assign, to the WCD, a traffic channel from another wireless coverage area defined by the same BTS that defines the first wireless coverage area, but on a different frequency. In this way, the WCD is assigned a traffic channel from a wireless coverage area that is likely to provide a reasonably strong signal strength to the WCD, while potentially being less utilized that the first wireless coverage area.

TABLE 2

Basing wireless coverage area assignment on signal strength.

| Wireless Coverage Area | Signal Strength |
|---|---|
| First wireless coverage area | −12 dB |
| Second wireless coverage area | −3 dB |
| Third wireless coverage area | −4 dB |

Figure 7:
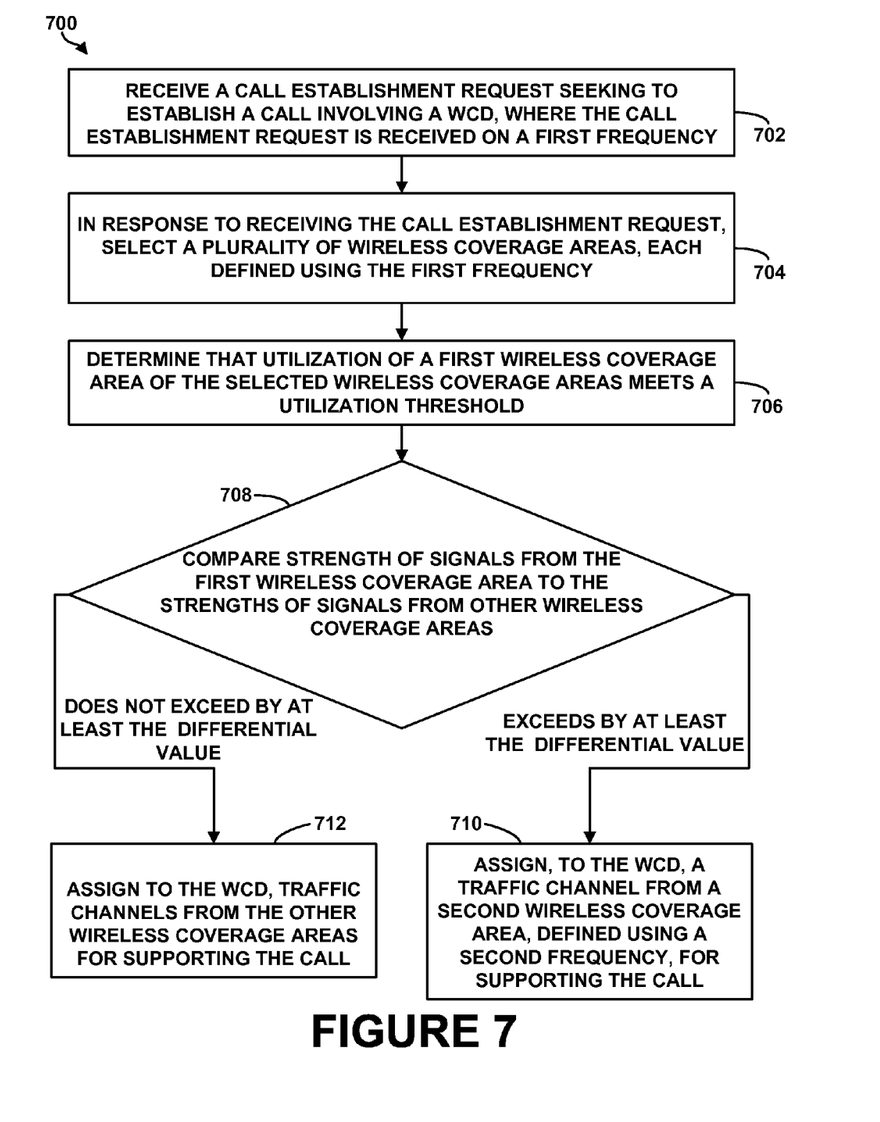
FIG. 7 is a first flow chart, in accordance with an example embodiment.

FIG. 7 is a flow chart 700 illustrating assignment of one or more traffic channels to a WCD. Flow chart 700 may include one or more operations, functions, or actions as illustrated by one or more of blocks 702-712. Although the blocks are illustrated in a sequential order, one or more of these blocks may, in some instances, be performed in parallel, and/or in a different order than those described herein. Also, the various blocks may be combined into fewer blocks, divided into additional blocks, and/or removed based upon implementations that are within the scope of the present embodiments.

In addition, each block may represent a module, a segment, or a portion of program code. This program code may include one or more instructions executable by a processor for implementing specific logical functions or steps in the process. The program code may be stored on any type of computer-readable medium or memory, for example, such as a storage device including a disk or hard drive. The computer-readable medium may be a non-transitory computer-readable medium, for example, such as computer-readable media that stores data for short periods of time like register memory, processor cache and Random Access Memory (RAM). The computer-readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer-readable medium may be considered a computer-readable storage medium, a tangible storage device, or other article of manufacture, for example. In addition, in flow chart 700 and other processes and methods disclosed herein, each block may represent circuitry that is configured to perform the specific logical functions in the process.

At block 702, a call establishment request seeking to establish a call involving a WCD may be received on a first frequency. For example, a RAN may receive the request from the WCD (i.e., a request for a mobile-originated call). The RAN may include several BTSs, each defining multiple wireless coverage areas using different frequencies.

At block 704, possibly in response to receiving the call establishment request, a plurality of wireless coverage areas, each defined using the first frequency, may be selected for supporting the call. Each wireless coverage area of the plurality of wireless coverage areas may be defined by a respective BTS. Each respective BTS may also define other wireless coverage areas on other frequencies different from the first frequency, as shown, for example, in FIG. 3. At block 706, utilization of a first wireless coverage area of the selected wireless coverage areas may be determined to meet a utilization threshold.

At block 708, strength of signals received at the WCD from the first wireless coverage area may be compared to the strengths of signals received at the WCD from other wireless coverage areas in the plurality of wireless coverage areas. For example, the RAN may determine whether a strength at which the WCD receives signals from the first wireless coverage area exceeds the strengths at which the WCD receives signals from the other wireless coverage areas (perhaps exceeding each individual received signal strength) by at least a signal strength differential value. The RAN may receive information indicative of the relative strength at which a WCD receives pilot signals from the selected plurality of wireless coverage areas. The RAN, based on such information, may perform the signal strength comparison.

At block 710, the strength at which the WCD receives signals from the first wireless coverage area may be determined to exceed respective signal strengths with which the WCD receives pilot signals from the other wireless coverage areas of the selected plurality of wireless coverage areas. The RAN may determine that the strength exceed the respective strengths by a predetermined margin or differential value. In this case, a traffic channel from a second wireless coverage area, defined using a second frequency, may be assigned to the WCD for supporting the call. The first wireless coverage area and the second wireless coverage area may both be defined by a particular BTS of the RAN, such as the BTS 202 in FIG. 3. As an example, referring to FIG. 3, the first wireless coverage area may be communicating with the WCD on a first frequency F3, and the second wireless coverage area may be communicating with the WCD on a second frequency F2. In some cases, the first frequency can be higher than the second frequency. In other cases, the second frequency can be higher than the first frequency. For instance, F2 may be in the range 1610-2025 MHz, while F3 may be in the range 2110-2200 MHz.

At block 712, the strength at which the WCD receives signals from the first wireless coverage area may be determined to not exceed the strengths at which the WCD receives signals from the other wireless coverage areas by at least the signal strength differential value. In this case, the RAN may assign, to the WCD, traffic channels from the other wireless coverage areas for supporting the call. In this manner, the RAN might not assign traffic channels from the first (loaded) wireless coverage areas to the WCD, and instead assign traffic channels from the one or more other wireless coverage areas to the WCD. In either case, the RAN may communicate with the WCD substantially simultaneously via each of the assigned wireless coverage areas.

As an example of substantially simultaneous communication, during an initial portion of the call, the RAN may exchange bearer traffic with the WCD via each of the assigned traffic channels. For instance, at least two wireless coverage areas may be selected for supporting the call, and the RAN may exchange the bearer traffic with the WCD substantially simultaneously via each assigned traffic channel. To exchange the bearer traffic with the WCD substantially simultaneously via each assigned traffic channel, the RAN may transmit and receive identical copies of the bearer traffic via each of the assigned traffic channels. As another example, the RAN may transmit, substantially simultaneously via different wireless coverage areas, multiple channel assignment messages to the WCD to assign the same channel. By transmitting multiple channel assignment messages to the WCD, the likelihood that the WCD may receive at least one of these messages is increased.

Figure 8:
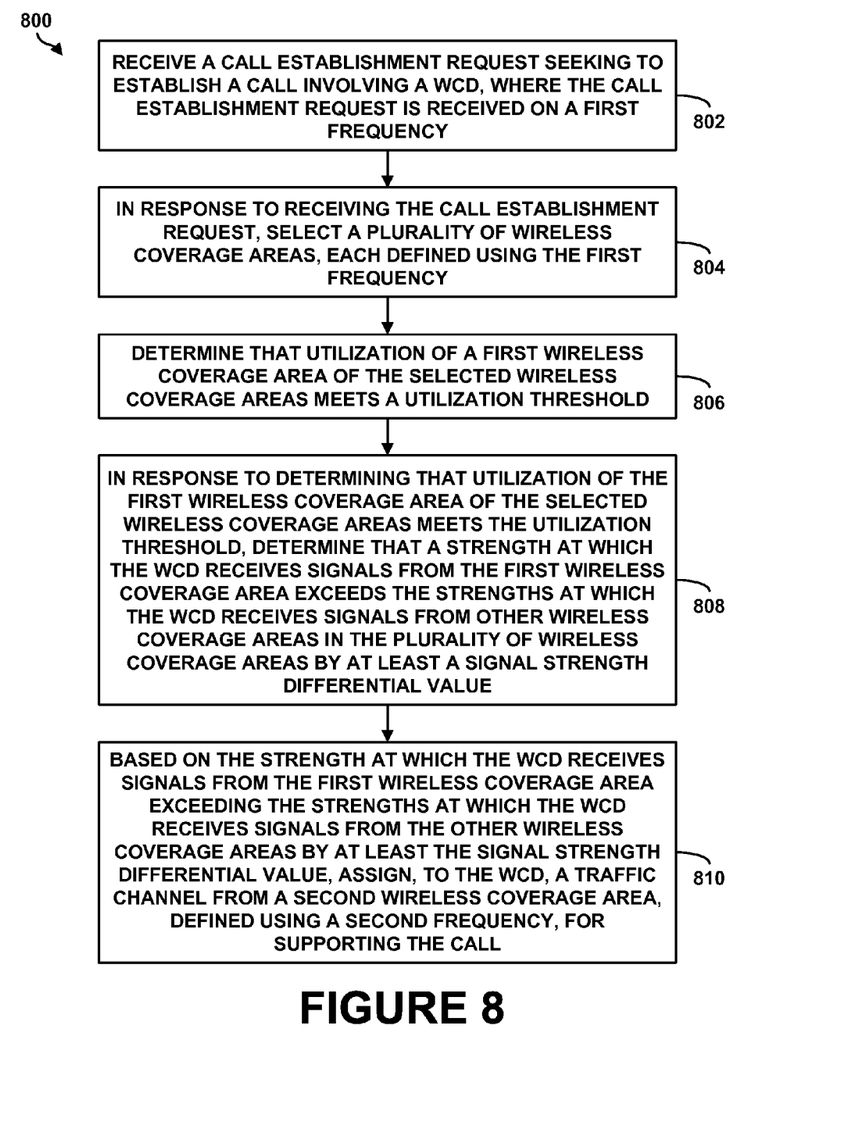
FIG. 8 is a second flow chart, in accordance with an example embodiment.

FIG. 8 is another flow chart 800 illustrating assignment of traffic channels to a WCD. At block 802, a call establishment request seeking to establish a call involving a WCD may be received on a first frequency. For example, a RAN may receive the request from the WCD (i.e., a request for a mobile-originated call). The RAN may include several BTSs, each defining multiple wireless coverage areas using different frequencies.

At block 804, possibly in response to receiving the call establishment request, a plurality of wireless coverage areas, each defined using the first frequency, may be selected for supporting the call. Each wireless coverage area of the plurality of wireless coverage areas may be defined by a respective BTS. Each respective BTS may also define other wireless coverage areas on other frequencies different from the first frequency as shown, for example, in FIG. 3. At block 806, utilization of a first wireless coverage area of the selected wireless coverage areas is determined to meet a utilization threshold.

At block 808, possibly in response to determining that utilization of the first wireless coverage area of the selected wireless coverage areas meets the utilization threshold, it may be determined that a strength at which the WCD receives signals from the first wireless coverage area exceeds the strengths at which the WCD receives signals from other wireless coverage areas in the plurality of wireless coverage areas (perhaps exceeding each individual received signal strength) by at least a signal strength differential value. The RAN may receive information indicative of the relative strength at which a WCD receives pilot signals from the selected plurality of wireless coverage areas. The RAN, based on such information, may determine that a strength at which the WCD receives signals from the first wireless coverage area exceeds respective signal strengths with which the WCD receives pilot signals from the other wireless coverage areas of the selected plurality of wireless coverage areas. The RAN may determine that the strength exceed the respective strengths by a predetermined margin or differential value.

At block 810, based on the strength at which the WCD receives signals from the first wireless coverage area exceeding the strengths at which the WCD receives signals from the other wireless coverage areas by at least the signal strength differential value, a traffic channel from a second wireless coverage area, defined using a second frequency, may be assigned, to the WCD, for supporting the call. The first wireless coverage area and the second wireless coverage area may both be defined by a particular BTS of the RAN, such as the BTS 202 in FIG. 3. As an example, referring to FIG. 3, the first wireless coverage area may be communicating with the WCD on a first frequency F3, and the second wireless coverage area may be communicating with the WCD on a second frequency F2. In some cases, the first frequency can be higher than the second frequency. In other cases, the second frequency can be higher than the first frequency.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving, by a radio access network (RAN), a call establishment request seeking to establish a call involving a wireless communication device (WCD), wherein the RAN receives the call establishment request on a first frequency;
   in response to receiving the call establishment request, selecting a plurality of wireless coverage areas, each defined by a respective base transceiver station (BTS) using the first frequency;
   determining that utilization of a first wireless coverage area of the selected wireless coverage areas meets a utilization threshold, wherein the first wireless coverage area is defined by a first BTS;
   in response to determining that utilization of the first wireless coverage area meets the utilization threshold, determining whether a strength at which the WCD receives signals from the first wireless coverage area exceeds the strengths at which the WCD receives signals from other wireless coverage areas in the plurality of wireless coverage areas defined by other BTSs by at least a predetermined signal strength differential value;
   if the strength at which the WCD receives signals from the first wireless coverage area exceeds the strengths at which the WCD receives signals from the other wireless coverage areas by at least the signal strength differential value, assigning, to the WCD, a first traffic channel from a second wireless coverage area, defined using a second frequency, for supporting the call, wherein the second wireless coverage area is defined by the first BTS; and
   if the strength at which the WCD receives signals from the first wireless coverage area does not exceed the strengths at which the WCD receives signals from the other wireless coverage areas by at least the signal strength differential value, assigning, to the WCD, a second traffic channel for supporting the call from a third wireless coverage area defined by a second BTS using the first frequency.

2. The method of claim 1, wherein the first frequency is higher than the second frequency.

3. The method of claim 1, wherein the second frequency is higher than the first frequency.

4. The method of claim 1, wherein the signal strength differential value is between 1 dB and 8 dB.

5. The method of claim 1, wherein the assigned traffic channel is one of a plurality of traffic channels assigned to the WCD, the method further comprising:
   during an initial portion of the call, the RAN exchanging bearer traffic with the WCD via each of the assigned traffic channels.

6. The method of claim 5, wherein exchanging the bearer traffic with the WCD via each of the assigned traffic channels comprises:
   exchanging the bearer traffic with the WCD substantially simultaneously via each assigned traffic channel.

7. The method of claim 6, wherein exchanging the bearer traffic with the WCD substantially simultaneously via each assigned traffic channel comprises:
   the RAN transmitting and receiving identical copies of the bearer traffic via each of the assigned traffic channels.

8. A method comprising:
receiving, by a radio access network (RAN), a call establishment request seeking to establish a call involving a wireless communication device (WCD), wherein the RAN receives the call establishment request on a first frequency;
in response to receiving the call establishment request, selecting a plurality of wireless coverage areas, each defined by respective base transceiver stations (BTSs) using the first frequency;
determining that utilization of a first wireless coverage area of the selected wireless coverage areas meets a utilization threshold;
in response to determining that utilization of the first wireless coverage area of the selected wireless coverage areas meets the utilization threshold, determining that a strength at which the WCD receives signals from the first wireless coverage area exceeds the strengths at which the WCD receives signals from other wireless coverage areas in the plurality of wireless coverage areas by at least a predetermined signal strength differential value; and
based on the strength at which the WCD receives signals from the first wireless coverage area exceeding the strengths at which the WCD receives signals from the other wireless coverage areas by at least the signal strength differential value, assigning, to the WCD, a traffic channel from a second wireless coverage area, defined using a second frequency, for supporting the call, wherein the first wireless coverage area and the second wireless coverage area are both defined by a particular BTS of the RAN.

9. The method of claim 8, wherein the first frequency is higher than the second frequency.

10. The method of claim 8, wherein the second frequency is higher than the first frequency.

11. The method of claim 8, further comprising:
during the call, the RAN exchanging bearer traffic with the WCD via the assigned traffic channel.

12. The method of claim 8, wherein the signal strength differential value is between 1 dB and 8 dB.

13. A non-transitory computer-readable medium having stored thereon program instructions that, upon execution by a radio access network (RAN) device of a RAN, cause the RAN device to perform functions comprising:
receiving a call establishment request seeking to establish a call involving a wireless communication device (WCD), wherein the RAN receives the call establishment request on a first frequency;
in response to receiving the call establishment request, selecting a plurality of wireless coverage areas, each defined by respective base transceiver stations (BTSs) using the first frequency;
determining that utilization of a first wireless coverage area of the selected wireless coverage areas meets a utilization threshold;
in response to determining that utilization of the first wireless coverage area of the selected wireless coverage areas meets the utilization threshold, determining that a strength at which the WCD receives signals from the first wireless coverage area exceeds the strengths at which the WCD receives signals from other wireless coverage areas in the plurality of wireless coverage areas by at least a predetermined signal strength differential value; and
based on the strength at which the WCD receives signals from the first wireless coverage area exceeding the strengths at which the WCD receives signals from the other wireless coverage areas by at least the signal strength differential value, assigning, to the WCD, a traffic channel from a second wireless coverage area, defined using a second frequency, for supporting the call, wherein the first wireless coverage area and the second wireless coverage area are both defined by a particular BTS of the RAN.

14. The non-transitory computer-readable medium of claim 13, wherein the first frequency is higher than the second frequency.

15. The non-transitory computer-readable medium of claim 13, wherein the second frequency is higher than the first frequency.

16. The non-transitory computer-readable medium of claim 13, during the call, the RAN exchanging bearer traffic with the WCD via the assigned traffic channel.

17. The non-transitory computer-readable medium of claim 13, wherein the signal strength differential value is between 1 dB and 8 dB.

18. The non-transitory computer-readable medium of claim 13, wherein the utilization of the first wireless coverage area is based on a number of traffic channels from the first wireless coverage area that are assigned to WCDs.

* * * * *